United States Patent
Song et al.

(10) Patent No.: US 12,058,661 B2
(45) Date of Patent: Aug. 6, 2024

(54) UPLINK INFORMATION SENDING METHOD AND TERMINAL

(71) Applicant: VIVO MOBILE COMMUNICATION CO., LTD., Guangdong (CN)

(72) Inventors: Yang Song, Chang'an Dongguan (CN); Peng Sun, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 540 days.

(21) Appl. No.: 17/180,253

(22) Filed: Feb. 19, 2021

(65) Prior Publication Data

US 2021/0227531 A1 Jul. 22, 2021

Related U.S. Application Data

(63) Continuation of application No. PCT/CN2019/097871, filed on Jul. 26, 2019.

(30) Foreign Application Priority Data

Aug. 24, 2018 (CN) .......................... 201810975153.6

(51) Int. Cl.
*H04W 72/044* (2023.01)
*H04W 16/28* (2009.01)
*H04W 72/21* (2023.01)

(52) U.S. Cl.
CPC .......... *H04W 72/046* (2013.01); *H04W 16/28* (2013.01); *H04W 72/21* (2023.01)

(58) Field of Classification Search
CPC .... H04W 72/046; H04W 72/21; H04W 16/28
See application file for complete search history.

(56) References Cited

U.S. PATENT DOCUMENTS

| 10,952,231 | B2* | 3/2021 | Liou .................... H04W 72/046 |
| 2013/0010745 | A1 | 1/2013 | Ko et al. |
| 2014/0376424 | A1 | 12/2014 | Seo et al. |
| 2017/0195096 | A1 | 7/2017 | Yamamoto et al. |
| 2018/0013481 | A1* | 1/2018 | Guo ...................... H04W 72/23 |

(Continued)

FOREIGN PATENT DOCUMENTS

| CN | 104205707 A | 12/2014 |
| CN | 108207032 A | 6/2018 |

(Continued)

OTHER PUBLICATIONS

Chinese Office Action dated Aug. 20, 2021 as received in application No. 201810975153.6.

(Continued)

*Primary Examiner* — Jasper Kwoh
(74) *Attorney, Agent, or Firm* — Price Heneveld, LLP

(57) ABSTRACT

A method for transmitting uplink information is provided. When a plurality of uplink information conflicts, a target spatial relationship of at least part of the uplink information in the plurality of uplink information is determined. The target spatial relationship is: at least one spatial relationship among spatial relationships configured or indicated by a network device for a terminal, According to the target spatial relationship, part of the uplink information is transmitted. Uplink information transmitted according to the same spatial relationship among the target spatial relationships does not conflict.

20 Claims, 2 Drawing Sheets

When a plurality of pieces of uplink information conflict, determine a target spatial relation of at least part of uplink information in the plurality of pieces of uplink information, where the target spatial relation is at least one spatial relation configured or indicated by a network device for a terminal — 21

Send the at least part of uplink information based on the target spatial relation, where uplink information sent based on a same spatial relation in the target spatial relation does not conflict — 22

(56) References Cited

U.S. PATENT DOCUMENTS

| | | |
|---|---|---|
| 2018/0176937 A1 | 6/2018 | Chen et al. |
| 2018/0199360 A1 | 7/2018 | Lin et al. |
| 2019/0174466 A1* | 6/2019 | Zhang ............... H04L 5/0057 |
| 2019/0327726 A1* | 10/2019 | Zhang ............... H04W 72/21 |
| 2020/0092055 A1* | 3/2020 | Choi ................... H04L 5/005 |
| 2020/0329471 A1 | 10/2020 | Zhang |
| 2020/0344788 A1* | 10/2020 | Li ....................... H04W 72/21 |

FOREIGN PATENT DOCUMENTS

| | | |
|---|---|---|
| EP | 3267592 A1 | 1/2018 |
| EP | 3334205 A1 | 6/2018 |
| JP | 2013524615 A | 6/2013 |
| WO | 2016125223 A1 | 8/2016 |
| WO | 2017193408 A1 | 11/2017 |

OTHER PUBLICATIONS

European Search Report dated Oct. 14, 2021 as received in application No. 19852278.1.

International Search Report and Written Opinion dated Mar. 11, 2021 as received in application No. PCT/CN2019/097871.

"Discussion on UL multi-panel/TRP operation" 3GPP TSG RAN WG1 Meeting NR Ad Hoc #3 R1-1715719, Nagoya, Japan, Sep. 18-21, 2017, Huawei.

"On RS Enhancement to Support Multi-TRP Operation" 3GPP TSG RAN WG1 Meeting #94 R1-1808718, Gothenburg, Sweden, Aug. 20-24, 2018 2018, Intel Corporation.

"Enhancements on multi-TRP/panel transmission in NR" 3GPP TSG RAN WG1 Meeting #94 R1-1809117, Gothenburg, Sweden, Aug. 20-24, 2018.

Japanese Office Action dated Mar. 28, 2022 as received in application No. 2021-510231.

Korean Office Action dated Apr. 7, 2022 as received in application No. 10-2021-7008570.

"Beam management for PUCCH" 3GPP TSG RAN WG 1 Meeting 91 R 1 1 7 19807 Reno, USA Nov. 27 December 1 , 2017, Huawei, HiSilicon.

"Issues on beam management" 3GPP TSG RAN WG1 Meeting AH 1801 R1-1800432 Vancouver, Canada, Jan. 22-26, 2018, Samsung.

* cited by examiner

UPLINK INFORMATION SENDING METHOD AND TERMINAL

CROSS-REFERENCE TO RELATED APPLICATIONS

This application is a continuation application of International Application No. PCT/CN2019/097871 filed on Jul. 26, 2019, which claims priority to Chinese Patent Application No. 201810975153.6, filed with the Chinese Patent Office on Aug. 24, 2018, which are incorporated herein by reference in its entirety.

TECHNICAL FIELD

The present disclosure relates to the field of communication technologies, and in particular, to an uplink information sending method and a terminal.

RELATED ART

A mobile communications system can support a multi transmit and receive point (multi-TRP)/multi-panel scenario, and multi-TRP transmission can increase transmission reliability and throughput performance. For example, a terminal (User Equipment, UE) may receive same data or different data from a plurality of TRPs.

For an uplink, a network device indicates one or more pieces of transmit beam information used by an uplink channel or an uplink signal sent by the UE, and a plurality of pieces of transmit beam information may correspond to a plurality of TRPs.

The uplink channel includes a physical uplink control channel (PUCCH), a physical uplink shared channel (PUSCH), and a physical random access channel (PRACH).

The uplink signal includes an uplink sounding reference signal (SRS), an uplink phase tracking reference signal (UL PTRS), an uplink demodulation reference signal (UL DMRS), a hybrid automatic repeat request-acknowledgement/negative acknowledgement (Hybrid ARQ, Hybrid Automatic Repeat Request-ACK/NACK, HARQ-ACK/NACK), a scheduling request (SR), a channel state information (CSI) report, and the like.

In the current Rel-15, the terminal forms an uplink transmit beam by using a spatial domain transmission filter, and one spatial relation corresponds to one uplink transmit beam. The network device configures a candidate spatial relation of each uplink channel/signal for the terminal by using spatial relation information (spatialRelationInfo) signaling of a radio resource control (RRC) layer. If spatialRelationInfo signaling configured for a PUCCH includes a plurality of candidate spatial relations, the network device further indicates, by using a Media Access Control control element (MAC CE), one or more spatial relations used by the PUCCH. If spatialRelationInfo signaling configured for a PUSCH includes a plurality of candidate spatial relations, the network device further indicates, by using a sounding reference signal resource indicator (SRS Indicator, SRI) of downlink control information (DCI), one or more spatial relations used by the PUSCH. Based on a type of a reference signal (RS) associated with an SRS, the network device may further indicate, by using a CSI-RS resource indicator (CRI), a synchronization signal block index (SSB Index), or an SRI, a spatial relation for sending an SRS resource.

In the related art, only multiplexing and discarding processing after a plurality of channels/signals in a single TRP scenario conflict is specified, but multiplexing and discarding processing after the plurality of channels/signals conflict cannot be implemented. Therefore, support for the multi-TRP scenario needs to be enhanced.

SUMMARY

According to a first aspect, an embodiment of the present disclosure provides an uplink information sending method, applied to a terminal, where the method includes:
  when a plurality of pieces of uplink information conflict, determining a target spatial relation of at least part of uplink information in the plurality of pieces of uplink information, where the target spatial relation is at least one spatial relation configured or indicated by a network device for the terminal; and
  sending the at least part of uplink information based on the target spatial relation, where uplink information sent based on a same spatial relation in the target spatial relation does not conflict.

According to a second aspect, an embodiment of the present disclosure provides a terminal, including:
  a first determining module, configured to: when a plurality of pieces of uplink information conflict, determine a target spatial relation of at least part of uplink information in the plurality of pieces of uplink information, where the target spatial relation is at least one spatial relation configured or indicated by a network device for the terminal; and
  a sending module, configured to send the at least part of uplink information based on the target spatial relation, where uplink information sent based on a same spatial relation in the target spatial relation does not conflict.

According to a third aspect, an embodiment of the present disclosure further provides a terminal, including a processor, a memory, and a computer program that is stored in the memory and that can run on the processor. When the computer program is executed by the processor, steps of the foregoing uplink information sending method are implemented.

According to a fourth aspect, an embodiment of the present disclosure further provides a computer-readable storage medium. The computer-readable storage medium stores a computer program, and when the computer program is executed by a processor, steps of the foregoing uplink information sending method are implemented.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
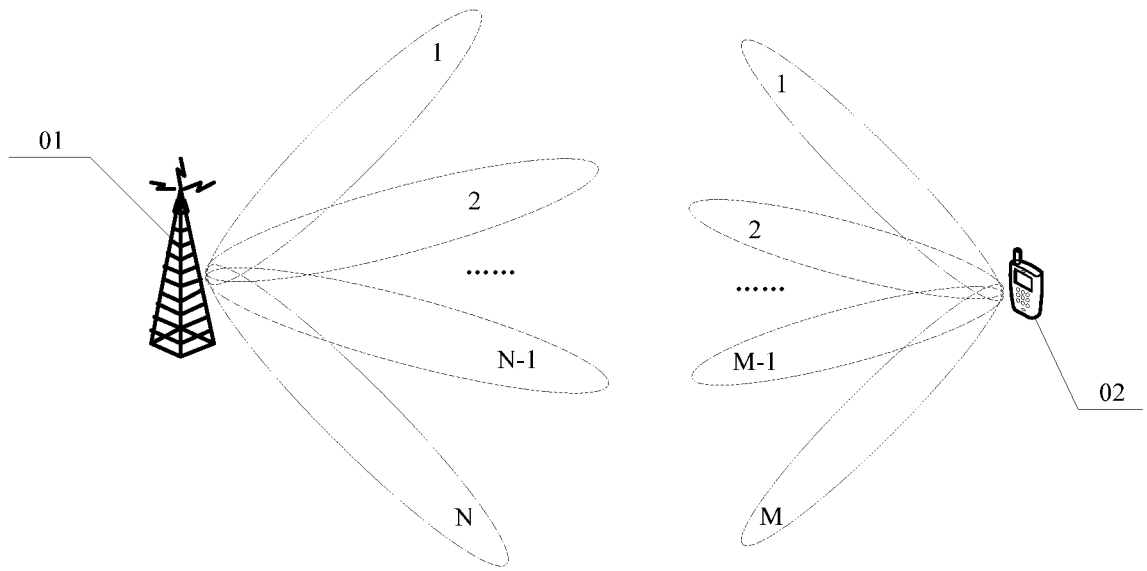
FIG. 1 is a block diagram of a mobile communications system to which an embodiment of the present disclosure is applied.

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings without creative efforts.

Terms such as "first" and "second" in the specification and claims of the present application are used to distinguish similar objects, instead of describing a specific sequence or order. It should be understood that data used in such a way can be exchanged in proper situations, so that the embodiments of the present disclosure described herein can be implemented in sequences other than those illustrated or depicted herein. In addition, the terms "comprise", "include", and any variants thereof are intended to cover non-exclusive inclusion. For example, a process, a method, a system, a product, or a device that includes a series of steps or units is not necessarily limited to those steps or units listed expressly, but instead may include other steps or units not expressly listed or inherent to the process, the method, the product, or the device. "And/or" used in the specification and claims means at least one of the connected objects.

Technologies described herein are not limited to a long time evolution (LTE)/LTE-advanced (LTE-A) system, and may further be applied to various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. The technology described herein can be used in the above-mentioned systems and radio technologies as well as other systems and radio technologies. However, the following describes an NR system for example purposes, and NR terms are used in most of the following descriptions to illustrate the NR system, although these technologies may also be applied to a system other than the NR system. A person skilled in the art may understand that terms do not constitute a limitation on the protection scope of the present disclosure.

The following description provides examples and does not limit the scope, applicability, or configuration set forth in the claims. Alterations may be made to functions and arrangements of the discussed elements without departing from the spirit and scope of the present disclosure. In various examples, various procedures or components may be omitted, replaced, or added appropriately. For example, the described method may be performed in a different order than the described order, and steps may be added, omitted, or combined. In addition, features described with reference to some examples may be combined in other examples.

Referring to FIG. 1, FIG. 1 is a block diagram of a wireless communications system to which an embodiment of the present disclosure can be applied. The wireless communications system includes a network device 01 and a terminal 02. The network device 01 may be a base station or a core network. The base station may be a base station of 5G or a later version (for example, a gNB or a 5G NR NB), or a base station in another communications system (for example, an eNB, a WLAN access point, or another access point). The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, or another appropriate term in the field. As long as a same technical effect is achieved, the base station is not limited to a specified technical word. It should be noted that in this embodiment of the present disclosure, only a base station or a transmit and receive point (TRP) in an NR system is used as an example, but a specific type of the base station is not limited. The terminal 02 may also be referred to as a terminal device or user equipment (UE). The terminal 02 may be a terminal-side device such as a mobile phone, a tablet computer (Tablet Personal Computer), a laptop computer, a personal digital assistant (PDA), a mobile internet device (MID), a wearable device, or a vehicle-mounted device. It should be noted that a specific type of the terminal 02 is not limited in this embodiment of the present disclosure.

The base station can communicate with the terminal 02 under the control of a base station controller. In various examples, the base station controller may be a part of the core network or some base stations. Some base stations can exchange control information or user data with the core network through backhaul. In some examples, some of these base stations can directly or indirectly communicate with each other over a backhaul link, and the backhaul link may be a wired or wireless communication link. The wireless communications system can support operations on a plurality of carriers (waveform signals of different frequencies). A multi-carrier transmitter can transmit modulated signals on the plurality of carriers simultaneously. For example, each communication link may be a multi-carrier signal modulated based on various radio technologies. Each modulated signal can be sent over different carriers and can carry control information (for example, a reference signal or a control channel), overhead information, data, and the like.

The base station can wirelessly communicate with the terminal 02 via one or more access point antennas. Each base station can provide communication coverage for each corresponding coverage area. A coverage area of an access point may be divided into sectors that form merely a part of the coverage area. The wireless communications system may include different types of base stations (for example, a macro base station, a micro base station, or a pico base station). The base station can also use different radio technologies, such as cellular or WLAN radio access technologies. The base station can be associated with the same or different access networks or operator deployment. Coverage areas of different base stations (including coverage areas of base stations of the same or different types, coverage areas using the same or different radio technologies, or coverage areas belonging to the same or different access networks) may overlap.

A communication link in the wireless communications system may include an uplink for carrying uplink (UL) transmission (for example, from the terminal 02 to the network device 01) or a downlink for carrying downlink (DL) transmission (for example, from the network device 01 to the terminal 02). The UL transmission may also be referred to as reverse link transmission, and the DL transmission may also be referred to as forward link transmission.

In the scenario shown in FIG. 1, signal transmission is implemented between the network device 01 and the terminal 02 by using a transmit antenna beam and a receive antenna beam. The transmit antenna beam is formed by a spatial domain transmission filter, and the receive antenna beam is formed by a spatial domain receive filter. Both the network device 01 and the terminal 02 may include a plurality of transmit/receive beams. Taking uplink transmission in FIG. 1 as an example, it is assumed that the network device 01 includes N TRPs, and each TRP includes one spatial domain receive filter to form N receive beams, and the terminal 02 includes M spatial domain transmission filters to form M transmit beams, where both N and M are integers greater than 1. N and M may be the same or different, which is not limited in this application. A spatial relation configured or indicated by the network device corresponds to an uplink transmit beam formed by a spatial domain transmission filter.

The terminal in the following embodiments of the present disclosure may be any device that communicates with the network device, and includes a terminal that supports multi-TRP/panel. The terminal may be configured or instructed by the network device to send uplink information by using a beam corresponding to one spatial relation, or may be configured or instructed by the network device to send uplink information by using beams corresponding to a plurality of spatial relations. A beam corresponding to a spatial relation configured or indicated by the network device for the terminal includes a beam set A, and a transmit beam configured or indicated by the network device for a plurality of pieces of uplink information includes a beam set B, where the set A is greater than or equal to the set B. In other words, if the terminal can send uplink information, the terminal is certainly configured with a beam for sending the uplink information.

Uplink information in the following embodiments of the present disclosure includes uplink data, a CSI report, a HARQ-ACK, an SR, an SRS, and the like. An uplink channel includes a PUCCH, a PUSCH, and a PRACH in a plurality of formats. An uplink signal includes an SRS and the like. A conflict between a plurality of pieces of uplink information means that at least one orthogonal frequency division multiplexing (OFDM) symbol of time-frequency resources of channels or signals that are used to transmit the plurality of pieces of uplink information on a same component carrier (CC) or different CCs overlaps in time domain. For example, when at least one OFDM symbol of time-frequency resources (for example, a PUCCH and a PUCCH or a PUCCH and a PUSCH) occupied by uplink channels used to transmit two CSI reports on a same CC overlaps in time domain, the two CSI reports conflict. For example, when at least one OFDM symbol of a time-frequency resource occupied by a PUCCH format 0 used for transmitting an SR and a time-frequency resource occupied by a PUCCH format 1 used for transmitting a HARQ-ACK on a same CC overlaps in time domain, the SR conflicts with the HARQ-ACK. For example, if at least one OFDM symbol of a time-frequency resource occupied by an aperiodic SRS and a time-frequency resource occupied by a PUCCH format 2 used for transmitting a CSI report on a same CC overlaps in time domain, the A-SRS conflicts with the CSI report.

Figure 2:
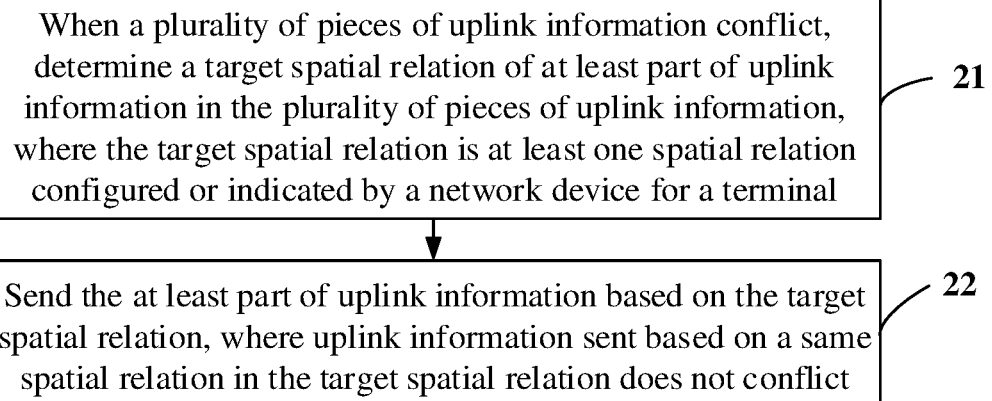
FIG. 2 is a schematic flowchart of an uplink information sending method according to an embodiment of the present disclosure.

As shown in FIG. 2, an embodiment of the present disclosure provides an uplink information sending method, applied to a terminal. Further, the terminal is a terminal that supports multi-TRP transmission, and the method includes the following steps.

Step 21: When a plurality of pieces of uplink information conflict, determine a target spatial relation of at least part of uplink information in the plurality of pieces of uplink information, where the target spatial relation is at least one of all spatial relations configured or indicated by a network device for the terminal.

The configuration may be that the network device configures a spatial relation for the terminal by using higher layer signaling (for example, RRC signaling), and the indication may be that the network device indicates a spatial relation to the terminal by using a MAC CE or DCI. For example, the network device configures a candidate spatial relation of each uplink channel/signal for the terminal by using spatialRelationInfo signaling of RRC. If spatialRelationInfo signaling configured for a PUCCH includes a plurality of candidate spatial relations, the network device further indicates, by using a MAC CE, one or more spatial relations used by the PUCCH. If spatialRelationInfo signaling configured for a PUSCH includes a plurality of candidate spatial relations, the network device further indicates, by using an SRI of DCI, one or more spatial relations used by the PUSCH. It should be noted that when the network device configures one candidate spatial relation of each uplink channel/signal for the terminal by using the spatialRelationInfo signaling of RRC, the network device may no longer specifically indicate, by using the MAC CE or the DCI, which spatial relation is used.

In this embodiment of the present disclosure, a system supports a plurality of spatial relations, the network device may support sending of a plurality of downlink beam corresponding to one or more spatial relations, and the terminal may also support sending of a plurality of uplink beams corresponding to one or more spatial relations. That a plurality of pieces of uplink information conflict may include: a plurality of pieces of uplink information on one uplink beam conflict, for example, uplink information 1 and uplink information 2 on a beam 1 conflict, or a plurality of pieces of uplink information transmitted on different uplink beams conflict, for example, uplink information 1 on a beam 1 conflicts with uplink information 3 on a beam 2.

The at least part of uplink information herein is to-be-sent uplink information determined by the terminal, and may be all of conflicting uplink information, or may be a part of conflicting uplink information.

Step 22: Send the at least part of uplink information based on the target spatial relation, where uplink information sent based on a same spatial relation in the target spatial relation does not conflict.

Herein, there may be one or more determined target spatial relations, but uplink information sent based on a same spatial relation does not conflict, so that the terminal can resolve a conflict between uplink information. It should be noted that uplink information sent based on different spatial relations may conflict. However, because the terminal may support simultaneous sending based on a plurality of spatial relations, the terminal may still ensure transmission validity and reliability of a plurality of pieces of conflicting uplink information to some extent. For example, the target spatial relation corresponds to a target beam 1 and a target beam 2, and uplink information 1 on the target beam 1 conflicts with uplink information 3 on the target beam 2. The terminal may send the target beam 1 and the target beam 2 simultaneously, so as to send the conflicting uplink information 1 and uplink information 3 simultaneously.

Before step 22, the method further includes: determining the at least part of to-be-sent uplink information in the plurality of pieces of uplink information. Specifically, a manner of determining the at least part of to-be-sent uplink information in the plurality of pieces of uplink information includes but is not limited to the following several types:

Manner 1-1: Determine the at least part of to-be-sent uplink information according to a multiplexing/discarding criterion.

For example, the network device configures or indicates that both an uplink channel 1 for transmitting uplink information 1 and an uplink channel 2 for transmitting uplink information 2 are sent by using a beam 1 corresponding to a spatial relation 1. If OFDM symbols of time-frequency resources occupied by the uplink channel 1 and the uplink channel 2 overlap in time domain, the uplink information 1 conflicts with the uplink information 2. According to the predefined multiplexing/discarding criterion, if it is determined that multiplexing processing is performed on the uplink information 1 and the uplink information 2, the uplink information 1 is multiplexed with the uplink information 2 according to the multiplexing/discarding criterion, and an uplink channel for transmitting uplink information after the multiplexing processing is determined. For example, the multiplexed uplink information 1 and uplink information 2 are sent on the uplink channel 2. According to the predefined multiplexing/discarding criterion, if it is determined that discarding processing is performed on the uplink information 1 and the uplink information 2, one of the uplink information 1 and the uplink information 2 is discarded according to the multiplexing/discarding criterion, and an uplink channel for transmitting uplink information after the discarding processing is determined. For example, the uplink information 1 is discarded. In this case, the uplink channel 1 for transmitting the uplink information 1 is not sent, but the uplink information 2 after the discarding processing is sent on the uplink channel 2.

For example, the network device configures or indicates that the uplink channel 1 for transmitting the uplink information 1 is sent by using the beam 1 corresponding to the spatial relation 1, and an uplink channel 3 for transmitting uplink information 3 is sent by using the beam 2 corresponding to a spatial relation 2. If OFDM symbols of time-frequency resources occupied by the uplink channel 1 and the uplink channel 3 overlap in time domain, the uplink information 1 conflicts with the uplink information 3. According to the predefined multiplexing/discarding criterion, if it is determined that multiplexing processing is performed on the uplink information 1 and the uplink information 3, the uplink information 1 is multiplexed with the uplink information 3 according to the multiplexing/discarding criterion, and an uplink channel for transmitting uplink information after the multiplexing processing is determined. For example, the multiplexed uplink information 1 and uplink information 3 are sent on the uplink channel 3. According to the predefined multiplexing/discarding criterion, if it is determined that discarding processing is performed on the uplink information 1 and the uplink information 3, one of the uplink information 1 and the uplink information 3 is discarded according to the multiplexing/discarding criterion, and an uplink channel for transmitting uplink information after the discarding processing is determined. For example, the uplink information 1 is discarded. In this case, the uplink channel 1 for transmitting the uplink information 1 is not sent, but the uplink information 3 after the discarding processing is sent on the uplink channel 3.

The multiplexing/discarding criterion may be a processing rule for a conflict between uplink information. For example, the multiplexing/discarding criterion includes but is not limited to the following:

1. Jointly determine, based on factors such as content of conflicting uplink information (for example, uplink data, CSI reports of various reporting period types, a HARQ-ACK, an SR, and SRSs of various sending period types), cells to which the uplink information belongs, and channels/signals for transmitting the uplink information (for example, a PUSCH, a PUCCH, and an SRS in various formats), whether to multiplex or discard the conflicting uplink information. If it is determined that multiplexing processing is to be performed, a plurality of pieces of conflicting uplink information are multiplexed (that is, according to the rule, a coding rate may need to be adjusted and mapping is performed on a time-frequency resource of an uplink channel), and an uplink channel for transmitting uplink information after the multiplexing processing is determined. If it is determined that discarding processing is to be performed, discarding is performed according to a priority of conflicting uplink information, and uplink information with a low priority is discarded. Priorities of uplink information are also jointly determined based on factors such as content of conflicting uplink information (for example, uplink data, an SRS, CSI reports of various reporting period types, a HARQ-ACK, an SR, and an SRS), cells to which the uplink information belongs, and channels/signals (for example, a PUSCH, a PUCCH, or an SRS in various formats) for transmitting the uplink information.

Manner 1-2: Discard at least one of the plurality of pieces of uplink information according to an instruction of the network device, to determine the at least part of to-be-sent uplink information.

In this manner, the network device configures or instructs to discard some uplink information in the plurality of pieces of conflicting uplink information. For example, the network device configures or instructs to send, by using the beam 1 corresponding to the spatial relation 1, a PUCCH for transmitting the uplink information 1, and the network device configures or instructs to send, by using the beam 2 corresponding to the spatial relation 2, a PUSCH for transmitting the uplink information 2. If OFDM symbols of time-frequency resources occupied by the uplink channel 1 and the uplink channel 2 overlap in time domain, the uplink information 1 conflicts with the uplink information 2. The network device instructs the terminal to discard uplink information transmitted on the PUCCH. The terminal discards, according to an instruction of the network device, the uplink information 1 transmitted on the PUCCH, and sends only the PUSCH for transmitting the uplink information 2.

Manner 1-3: Discard at least one of the plurality of pieces of uplink information according to a preset discarding criterion, to determine the at least part of to-be-sent uplink information.

In this manner, some uplink information in the plurality of pieces of conflicting uplink information is discarded according to the preset discarding criterion. The preset discarding criterion is related to a priority of the uplink information, a priority of a channel/signal on which the uplink information is located, a priority of the spatial relation, and a terminal capability of the terminal. For example, uplink information with a highest priority or a lowest priority is discarded, or uplink information configured or instructed to be sent in an uplink spatial relation with a highest priority or a lowest priority is discarded.

The preset discarding criterion may be a processing rule for a conflict between uplink information. For example, the preset discarding criterion includes but is not limited to the following:

1. Discard information in the plurality of pieces of uplink information except uplink information corresponding to a channel/signal to be preferentially used. For example, if the preset discarding criterion determines that a PUCCH is preferentially used, uplink information carried in another channel or signal in the plurality of pieces of conflicting uplink information is discarded.
2. Discard information in the plurality of pieces of uplink information except uplink information corresponding to a spatial relation to be preferentially used. For example, if the preset discarding criterion determines that the spatial relation 1 is preferentially used, uplink information corresponding to another spatial relation in the plurality of pieces of conflicting uplink information is discarded.

In manner 1-2 and manner 1-3, the step of discarding at least one of the plurality of pieces of uplink information includes: discarding a first part of uplink information in the plurality of pieces of uplink information, where the first part of uplink information is uplink information sent in at least one spatial relation in the target spatial relation according to a configuration or an instruction. In other words, in the manner 1-2, the network device instructs the terminal to discard uplink information that is previously configured to be sent based on some spatial relations. In the manner 1-3, the terminal determines, according to the preset discarding criterion, to discard uplink information that is previously configured to be sent based on some spatial relations. Alternatively, the step of discarding at least one of the plurality of pieces of uplink information includes: discarding a second part of uplink information in the plurality of pieces of uplink information, where the second part of uplink information is uplink information sent on at least one channel/signal in a target channel/signal according to a configuration or an instruction. In other words, in the manner 1-2, the network device instructs the terminal to discard uplink information that is previously configured to be carried in some channels/signals for sending. In the manner 1-3, the terminal determines, according to the preset discarding criterion, to discard uplink information that is previously configured to be carried in some channels/signals for sending.

Manner 1-4: Determine all of the plurality of pieces of uplink information as the at least part of to-be-sent uplink information.

In this manner, the plurality of pieces of conflicting uplink information are reserved. To avoid a conflict between uplink information corresponding to a same spatial relation, conflicting uplink information corresponding to a same spatial relation may be switched to a beam corresponding to another spatial relation for sending.

In this embodiment of the present disclosure, one spatial relation corresponds to one uplink beam. The terminal may support a capability of sending uplink information based on only one spatial relation simultaneously, that is, the terminal supports a capability of sending uplink information on one beam. The terminal may also support a capability of sending uplink information based on a plurality of spatial relations simultaneously, that is, the terminal supports a capability of sending uplink information on more than one beam. It should be noted that when the terminal supports the capability of sending uplink information on more than one beam, the terminal may alternatively send the uplink information by using only one beam.

In this embodiment of the present disclosure, in a scenario in which the terminal supports multi-TRP. When the plurality of pieces of uplink information sent by the terminal conflict, perform conflict processing on the plurality of pieces of uplink information. for example, discarding, multiplexing, or switching of conflicting uplink information, to obtain a target spatial relation of at least part of uplink information after the conflict processing. The at least part of uplink information is sent on a beam corresponding to the target spatial relation. Therefore, a solution of how the terminal sends uplink information after the uplink information conflicts in the scenario in which the terminal supports multi-TRP is provided, thereby enhancing support of the terminal for the multi-TRP scenario.

The following embodiments of the present disclosure further describe the uplink information sending method in the present disclosure with reference to different scenarios.

Scenario 1: The terminal is configured or instructed to send the plurality of pieces of uplink information based on a same spatial relation.

The scenario means that the plurality of pieces of conflicting uplink information are preconfigured or instructed to be sent based on a same spatial relation. In other words, that a plurality of pieces of uplink information conflict is: a plurality of pieces of uplink information that are configured or instructed by the network device to be sent by using uplink beams corresponding to a same spatial relation conflict.

For example, a PUCCH is configured or instructed by the network device to be sent by using the beam 1 corresponding to the spatial relation 1, and a PUSCH is configured or instructed by the network device to be sent by using the beam 1 corresponding to the spatial relation 1. If at least one OFDM symbol of time domain resources of the PUCCH and the PUSCH overlaps in time domain, uplink information transmitted on the PUCCH and the PUSCH conflicts.

For another example, one PUCCH is configured or instructed by the network device to be sent by using the beam 1 corresponding to the spatial relation 1, and another PUCCH is configured or instructed by the network device to be sent by using the beam 1 corresponding to the spatial relation 1. If at least one OFDM symbol of time-frequency resources of the two PUCCHs overlaps in time domain, uplink information transmitted on the two PUCCHs conflicts.

For another example, a PUCCH/PUSCH is configured or instructed by the network device to be sent by using the beam 1 corresponding to the spatial relation 1, and an SRS is configured or instructed by the network device to be sent by using the beam 1 corresponding to the spatial relation 1. If at least one OFDM symbol of time-frequency resources of the PUCCH/PUSCH and the SRS overlaps in time domain, uplink information transmitted on the PUCCH/PUSCH conflicts with the SRS.

In this scenario, step 21 may be implemented in but is not limited to the following manners:

Manner 2-1: Determine, as a target spatial relation, an original spatial relation configured or indicated for the plurality of pieces of uplink information.

In this manner, assuming that the network device configures a PUCCH and a PUSCH to be sent on the beam 1 corresponding to the spatial relation 1. And uplink information transmitted on the PUCCH and the PUSCH conflicts.

The spatial relation 1 is determined as a target spatial relation, to ensure that uplink information sent in the spatial relation 1 does not conflict.

Determine at least part of uplink information by discarding one of the PUCCH and the PUSCH in the foregoing manners 1-1, 1-2, and 1-3.

or

Manner 2-2: Determine, as a target spatial relation, a new spatial relation configured or indicated by the network device, where the new spatial relation is different from an original spatial relation configured or indicated by the plurality of pieces of uplink information.

In this manner, assuming that the network device configures or instructs a PUCCH and a PUSCH to be sent on the beam 1 corresponding to the spatial relation 1, and uplink information transmitted on the PUCCH and the PUSCH conflicts, the network device may further configure or indicate that the spatial relation 2 is a target spatial relation.

The determining at least part of uplink information by discarding one of the PUCCH and the PUSCH in the foregoing manners 1-1, 1-2, and 1-3.

or

Manner 2-3: Determine, as a target spatial relation, a new spatial relation determined according to a preset switching criterion, where the new spatial relation is different from an original spatial relation configured or indicated by the plurality of pieces of uplink information.

In this manner, assuming that the network device configures or instructs a PUCCH and a PUSCH to be sent on the beam 1 corresponding to the spatial relation 1, and uplink information transmitted on the PUCCH and the PUSCH conflicts, the terminal may further determine the spatial relation 2 as a target spatial relation according to the preset switching criterion.

Determine at least part of uplink information by discarding one of the PUCCH and the PUSCH in the foregoing manners 1-1, 1-2, and 1-3.

It should be noted that this manner is applicable to a scenario in which the terminal supports the capability of sending uplink information based on only one spatial relation simultaneously, and is also applicable to a scenario in which the terminal supports the capability of sending uplink information based on a plurality of spatial relations simultaneously. When the terminal supports the capability of sending uplink information based on a plurality of spatial relations simultaneously, step 21 may further be implemented in the following manner:

Manner 2-4: Determine, as a target spatial relation, an original spatial relation configured or indicated for the plurality of pieces of uplink information and a new spatial relation configured or indicated by the network device, where the new spatial relation is different from the original spatial relation.

In this manner, assuming that the network device configures or instructs a PUCCH and a PUSCH to be sent on the beam 1 corresponding to the spatial relation 1, and uplink information transmitted on the PUCCH and the PUSCH conflicts, the spatial relation 1 may be determined as one of target spatial relations. In addition, the network device may also configure or indicate the spatial relation 2 as a target spatial relation.

Determine at least part of uplink information by discarding, in the foregoing manners 1-1, 1-2, and 1-3, one piece of uplink information transmitted on the PUCCH and the PUSCH, or by reserving conflicting uplink information in the foregoing manners 1-1 and 1-4, and switching uplink information corresponding to a same spatial relation to another spatial relation for sending, to ensure that uplink information sent based on a same spatial relation in the target spatial relation does not conflict.

Manner 2-5: Determine, as a target spatial relation, an original spatial relation configured or indicated for the plurality of pieces of uplink information and a new spatial relation determined according to a preset switching criterion, where the new spatial relation is different from the original spatial relation.

In this manner, assuming that the network device configures or instructs a PUCCH and a PUSCH to be sent on the beam 1 corresponding to the spatial relation 1, and uplink information transmitted on the PUCCH and the PUSCH conflicts, the spatial relation 1 may be determined as one of target spatial relations. In addition, the terminal may also determine the spatial relation 2 as a target spatial relation according to the preset switching criterion.

Similar to the manner 2-2, determine at least part of uplink information by discarding one piece of uplink information transmitted on the PUCCH and the PUSCH in the foregoing manners 1-1, 1-2, and 1-3, or by reserving conflicting uplink information in the foregoing manners 1-1 and 1-4. Then switch uplink information corresponding to a same spatial relation to another spatial relation for sending.

The foregoing describes a scenario in which the plurality of pieces of conflicting uplink information are sent based on a same spatial relation. The following describes another scenario of this embodiment of the present disclosure.

Scenario 2: The terminal is configured or instructed to send the plurality of pieces of uplink information based on different spatial relations.

The scenario means that the plurality of pieces of conflicting uplink information are preconfigured or instructed to be sent based on a plurality of different spatial relations. In other words, that a plurality of pieces of uplink information conflict may include: a plurality of pieces of uplink information that are configured or instructed by the network device to be sent by using uplink beams corresponding to different spatial relation information conflict.

For example, a PUCCH is configured or instructed by the network device to be sent by using the beam 1 corresponding to the spatial relation 1, a PUSCH is configured or instructed by the network device to be sent by using the beam 2 corresponding to the spatial relation 2. At least one OFDM symbol of time-frequency resources of the PUCCH and the PUSCH overlaps in time domain, and uplink information transmitted on the PUCCH and the PUSCH conflicts.

For another example, one PUCCH is configured or instructed by the network device to be sent by using the beam 1 corresponding to the spatial relation 1, and another PUCCH is configured or instructed by the network device to be sent by using the beam 2 corresponding to the spatial relation 2. If at least one OFDM symbol of time-frequency resources of the two PUCCHs overlaps in time domain, uplink information transmitted on the two PUCCHs conflicts.

For another example, a PUCCH/PUSCH is configured or instructed by the network device to be sent by using the beam 1 corresponding to the spatial relation 1, and an SRS is configured or instructed by the network device to be sent by using the beam 2 corresponding to the spatial relation 2. If at least one OFDM symbol of time-frequency resources of the PUCCH/PUSCH and the SRS overlaps in time domain, uplink information transmitted on the PUCCH/PUSCH conflicts with the SRS.

In this scenario, step 21 may be implemented in but is not limited to at least one of the following manners:

Manner 3-1: Determine, as a target spatial relation according to a preset switching criterion or a configuration or an instruction of the network device, at least one original spatial relation configured or indicated for the plurality of pieces of uplink information.

In this manner, assume that the network device configures or instructs a PUCCH to be sent on the beam 1 corresponding to the spatial relation 1, configures or instructs a PUSCH to be sent on the beam 2 corresponding to the spatial relation 2. When uplink information transmitted on the PUCCH and the PUSCH conflicts, the spatial relation 1 determined according to the preset switching criterion or configured or indicated by the network device, or the spatial relation 2 determined according to the preset switching criterion or configured or indicated by the network device is determined the target spatial relation. An uplink channel (for example, a PUSCH) that is used to transmit uplink information after the conflict processing is sent on a beam corresponding to the target spatial relation.

When the terminal supports the capability of sending uplink information based on only one spatial relation simultaneously, one original spatial relation configured or indicated for the plurality of pieces of uplink information is determined as a target spatial relation according to the preset switching criterion or the configuration or the instruction of the network device.

When the terminal supports the capability of sending uplink information based on a plurality of spatial relations simultaneously, a plurality of original spatial relations configured or indicated for the plurality of pieces of uplink information is determined as a target spatial relation according to the preset switching criterion or the configuration or the instruction of the network device. Alternatively, at least one original spatial relation configured or indicated for the plurality of pieces of uplink information is determined as a target spatial relation according to the preset switching criterion or the configuration or the instruction of the network device. And at least one new spatial relation determined in the following manner 3-2 or 3-3 may be determined as a target spatial relation.

The determining at least part of uplink information may be discarding, in the foregoing manners 1-1, 1-2, and 1-3, one piece of uplink information transmitted on the PUCCH and the PUSCH, or may be reserving conflicting uplink information in the foregoing manner 1-1.

Manner 3-2: Determine, as a target spatial relation, a new spatial relation configured or indicated by the network device, where the new spatial relation is different from an original spatial relation.

In this manner, assume that the network device configures or instructs a PUCCH to be sent on the beam 1 corresponding to the spatial relation 1, configures or instructs a PUSCH to be sent on the beam 2 corresponding to the spatial relation 2. When uplink information transmitted on the PUCCH and the PUSCH conflicts, the network device may configure or indicate that a spatial relation 3 is a target spatial relation. An uplink channel (for example, a PUSCH) that is used to transmit uplink information after the conflict processing is sent on a beam corresponding to the target spatial relation.

When the terminal supports the capability of sending uplink information based on only one spatial relation simultaneously, one new spatial relation configured or indicated by the network device is determined as a target spatial relation.

When the terminal supports the capability of sending uplink information based on a plurality of spatial relations simultaneously, a plurality of new spatial relations configured or indicated by the network device are determined as target spatial relations. Alternatively, at least one new spatial relation configured or indicated by the network device is determined as a target spatial relation, and at least one original spatial relation determined in the following manner 3-1 may be determined as a target spatial relation.

Similar to manner 3-1, the determining at least part of uplink information may be discarding one of the PUCCH and the PUSCH in the foregoing manners 1-1, 1-2, and 1-3, or may be reserving, in the foregoing manner 1-1, conflicting uplink information transmitted on the PUCCH and the PUSCH.

Manner 3-3: Determine, as a target spatial relation, a new spatial relation determined according to a preset switching criterion.

In this manner, assume that the network device configures or instructs a PUCCH to be sent on the beam 1 corresponding to the spatial relation 1, configures or instructs a PUSCH to be sent on the beam 2 corresponding to the spatial relation 2. When uplink information transmitted on the PUCCH and the PUSCH conflicts, the terminal may further determine the spatial relation 3 as a target spatial relation according to the preset switching criterion. An uplink channel (for example, a PUSCH) that is used to transmit uplink information after the conflict processing is sent on a beam corresponding to the target spatial relation.

When the terminal supports the capability of sending uplink information based on only one spatial relation simultaneously, one new spatial relation determined according to the preset switching criterion is determined as a target spatial relation.

When the terminal supports the capability of sending uplink information based on a plurality of spatial relations simultaneously, a plurality of new spatial relations determined according to the preset switching criterion are determined as target spatial relations. Alternatively, at least one new spatial relation determined according to the preset switching criterion is determined as a target spatial relation, and at least one original spatial relation determined in the following manner 3-1 may be determined as a target spatial relation.

Similar to manners 3-1 and 3-2, the determining at least part of uplink information may be discarding, in the foregoing manners 1-1, 1-2, and 1-3, one piece of uplink information transmitted on the PUCCH and the PUSCH, or may be reserving, in the foregoing manner 1-1, conflicting uplink information transmitted on the PUCCH and the PUSCH.

It should be noted that, because an SRS is used to measure quality of an uplink channel, if the SRS is not discarded, the SRS can only be sent in a configured or indicated spatial relation, and cannot be switched to another spatial relation for sending. If conflicting uplink information may be switched to another spatial relation for sending, the SRS is preferably sent in the configured or indicated original spatial relation, and other uplink information is switched to the another spatial relation for sending.

In manners 2-3 and 2-5 in the scenario 1 and manners 3-1 and 3-3 in the scenario 2, the at least one spatial relation in the target spatial relation is determined according to the preset switching criterion. Specifically, the preset switching criterion may include but is not limited to at least one of the following:

(1) Determine, as a target spatial relation, a first spatial relation configured or indicated for a target channel/signal.

The target channel may be any type of uplink channel. For example, the target channel may include at least one of a physical random access channel (PRACH), a physical uplink control channel PUCCH, and a physical uplink shared channel PUSCH. The target signal may be any type of uplink signal. For example, the target signal may include a sounding reference signal SRS.

It is assumed that the preset switching criterion instructs to determine a spatial relation corresponding to the PUCCH as a target spatial relation. In this case, it is assumed that the network device configures both the SRS and the PUSCH to be sent on the beam 1 corresponding to the spatial relation 1, and configures the PUCCH to be sent on the beam 2 corresponding to the spatial relation 2. Uplink information transmitted on the PUSCH conflicts with the SRS. In this case, the terminal determines that the spatial relation 2 is one of target spatial relations.

For the manner 2-3 in the scenario 1 and the manners 3-1 and 3-3 in the scenario 2, if the terminal supports the capability of sending uplink information based on only one spatial relation simultaneously, the terminal may switch the PUSCH to the beam 2 corresponding to the PUCCH for sending. If the PUSCH conflicts with the uplink information transmitted on the PUCCH, an uplink channel (for example, a PUSCH) for transmitting uplink information after the multiplexing or discarding processing is sent on the beam 2. If there is no conflict between the PUSCH and the uplink information transmitted on the PUCCH, both the PUCCH and the PUSCH are sent on the beam 2. If no uplink information of the PUCCH is sent in this case, the PUSCH is sent on the beam 2.

Corresponding to the manner 2-5 in the scenario 1 and the manners 3-1 and 3-3 in the scenario 2, if the terminal supports the capability of sending uplink information based on a plurality of spatial relations, the terminal may determine both the spatial relation 1 and the spatial relation 2 as target spatial relations. Because the SRS is used to measure channel quality, the SRS may be sent on the original beam 1. If the PUSCH conflicts with the uplink information transmitted on the PUCCH, an uplink channel (for example, a PUSCH) for transmitting uplink information after the multiplexing or discarding processing is sent in the spatial relation 2. If there is no conflict between the PUSCH and the uplink information transmitted on the PUCCH, both the PUCCH and the PUSCH are sent on the beam 2. If no uplink information of the PUCCH is sent in this case, the PUSCH is sent on the beam 2.

(2) Determine, as a target spatial relation, a second spatial relation configured or indicated for target uplink information, where a priority of the target uplink information is higher than or lower than a priority of other uplink information, and the other uplink information is at least one of the plurality of pieces of uplink information except the target uplink information.

For example, one of a plurality of original beams is selected as a target beam. It is assumed that the preset switching criterion is that a second spatial relation corresponding to one piece of uplink information with a higher priority is determined as a target spatial relation. In this case, it is assumed that the network device configures or instructs a PUSCH for transmitting an aperiodic CSI report (uplink information 1) can be sent on the beam 1 corresponding to the spatial relation 1, network device configures or instructs a PUCCH for transmitting a periodic CSI report (uplink information 2) can be sent on the beam 2 corresponding to the spatial relation 2, and network device configures or instructs a PUCCH for transmitting another periodic CSI report (uplink information 3) can be sent on the beam 3 corresponding to the spatial relation 3. A priority relationship of the uplink information is as follows: A priority of the uplink information 1 is higher than a priority of the uplink information 2, and the priority of the uplink information 2 is higher than a priority of the uplink information 3.

For the manner 2-3 in the scenario 1 and the manners 3-1 and 3-3 in the scenario 2, if the terminal supports the capability of sending uplink information based on only one spatial relation simultaneously, the terminal may determine the target spatial relation based on priorities of the uplink information 1, the uplink information 2, and the uplink information 3. Because the uplink information 1 has a highest priority, the terminal determines the spatial relation 1 corresponding to the uplink information 1 as the target beam. Then, uplink information that is in the uplink information 1, the uplink information 2, and the uplink information 3 and that conflicts with each other is processed according to the multiplexing/discarding criterion, and an uplink channel for transmission is determined, and the uplink information is sent on the beam 1 together with an uplink channel on which no conflict occurs.

For the manner 2-5 in the scenario 1 and the manners 3-1 and 3-3 in the scenario 2, if the terminal supports the capability of sending uplink information based on a maximum of two spatial relations, the terminal may determine a maximum of two target spatial relations based on priorities of the uplink information 1, the uplink information 2, and the uplink information 3. Because the uplink information 1 and the uplink information 2 are two of a highest priority, the terminal may simultaneously determine the spatial relation 1 corresponding to the uplink information 1 and the spatial relation 2 corresponding to the uplink information 2 as target spatial relations. In this case, the uplink information 1 may be sent on the beam 1, the uplink information 2 is sent on the beam 2, and the uplink information 3 may be sent on the beam 1 or the beam 2. The uplink information 3 is preferentially sent on a conflict-free target beam. For example, if the uplink information 3 conflicts only with the uplink information 1, but does not conflict with the uplink information 2, the uplink information 3 is preferentially sent on the beam 2 corresponding to the uplink information 2. If the uplink information 3 conflicts with other uplink information, a beam corresponding to uplink information of a higher priority for which multiplexing processing may be performed is preferentially selected for sending.

(3) Determine a third spatial relation as a target spatial relation, where the third spatial relation is a predefined default spatial relation, or the third spatial relation is a spatial relation with a highest priority in spatial relations corresponding to the plurality of pieces of uplink information, or the third spatial relation is a spatial relation with a highest priority in spatial relations corresponding to the terminal.

If a predefined default spatial relation or a default spatial relation configured by the network device/a spatial relation with a highest priority in spatial relations corresponding to a plurality of pieces of uplink information/a spatial relation with a highest priority in spatial relations corresponding to the terminal is the spatial relation 2, the spatial relation 2 is determined as a target spatial relation.

It is assumed that the network device configures a PUSCH to be sent on the beam 1 corresponding to the spatial relation 1, and configures a PUCCH to be sent on the beam 2 corresponding to the spatial relation 2. In this case, the terminal determines the beam 2 as one of target beams. If the terminal supports the capability of sending uplink information based on only one spatial relation simultaneously, the terminal may perform multiplexing/discarding processing on uplink information transmitted on the PUSCH and uplink information transmitted on the PUCCH, and performs sending on the determined beam 2 for transmitting an uplink channel after the multiplexing/discarding processing. If the terminal supports the capability of sending uplink information based on a plurality of spatial relations, the terminal may determine the spatial relation 1 and the spatial relation 2 as target spatial relations, and the PUSCH and the PUCCH may be separately sent on the beam 1 and the beam 2.

It is assumed that the network device configures both the PUSCH and the PUCCH to be sent on the beam 1 corresponding to the spatial relation 1. In this case, the terminal determines the beam 2 as one of target beams. If the terminal supports the capability of sending uplink information based on only one spatial relation simultaneously, the terminal may perform multiplexing/discarding processing on uplink information transmitted on the PUSCH and uplink information transmitted on the PUCCH, and performs sending on the determined beam 2 for transmitting an uplink channel after the multiplexing/discarding processing. If the terminal supports the capability of sending uplink information based on a maximum of two spatial relations, the terminal may simultaneously determine the spatial relation 1 and the spatial relation 2 as target spatial relations. Uplink information of a high priority or a low priority may be preferentially switched to a default target spatial relation without discarding processing. For example, if a priority of uplink information transmitted on the PUSCH is higher than that of uplink information transmitted on the PUCCH, the PUSCH with a higher priority may be sent on the beam 1, and the PUCCH with a lower priority may be sent on the beam 2.

In particular, conflicting uplink information for which multiplexing processing may be performed on is sent on a beam corresponding to original space information configured or indicated by the network device. If discarding processing needs to be performed, processing may be performed according to the foregoing preset switching criterion.

(4) Determine, as a target spatial relation, a fourth spatial relation most recently indicated or configured by the network device.

(5) Determine a fifth spatial relation as a target spatial relation, where the fifth spatial relation is a spatial relation corresponding to at least one uplink channel measurement resource with best receiving quality in a preset time period.

For a specific manner of switching and transmission in the preset switching criterion (4) and (5), refer to the manner described in (3). Details are not described herein again. In the scenario 2, when the terminal supports the capability of sending uplink information based on a plurality of spatial relations simultaneously, step 21 may be implemented in the following manner:

Manner 4-1: When the plurality of pieces of uplink information include at least one piece of first uplink information, determine, as a target spatial relation of the first uplink information, at least one spatial relation configured or indicated for the first uplink information, and determine, as a target spatial relation of other uplink information, another spatial relation configured or indicated for the first uplink information.

At least two spatial relations are configured or indicated for the first uplink information, and the other uplink information is at least one of the plurality of pieces of uplink information except the first uplink information. It is assumed that the network device configures or instructs the PUCCH to be sent on the beam 1 corresponding to the spatial relation 1, the beam 2 corresponding to the spatial relation 2, and the beam 3 corresponding to the spatial relation 3. The PUSCH is sent on the beam 2, and the SRS is sent on the beam 3. If the PUCCH on the beam 2 conflicts with the uplink information transmitted on the PUSCH, and the SRS on the beam 3 conflicts with the uplink information transmitted on the PUCCH, the terminal determines the spatial relation 1 as one of target spatial relations, and sends the PUCCH on the beam 1 corresponding to the spatial relation 1; and determines the spatial relation 2 and the spatial relation 3 as target spatial relations, sends the PUSCH on the beam 2 corresponding to the spatial relation 2, and sends the SRS on the beam 3 corresponding to the spatial relation 3.

The foregoing separately describes the uplink information transmission method in this embodiment of the present disclosure with respect to the scenario 1 and the scenario 2. This embodiment of the present disclosure is further applicable to a joint scenario of the scenario 1 and the scenario 2. The joint scenario is as follows:

When the network device configures or instructs the plurality of pieces of uplink information to be sent on beams corresponding to a plurality of spatial relations, if there is a conflict between uplink information sent on beams of a same spatial relation and there is a conflict between uplink information sent on beams of different spatial relations, the following operation is performed.

If the terminal supports the capability of sending uplink information based on only one spatial relation simultaneously, the terminal may perform multiplexing or discarding processing on all conflicting uplink information according to the multiplexing/discarding criterion, and then send, in the target spatial relation, an uplink channel for transmitting uplink information after the multiplexing or discarding processing.

If the terminal supports the capability of sending uplink information based on a plurality of spatial relations simultaneously, the terminal may first determine at least one target spatial relation, perform, according to the multiplexing/discarding criterion, multiplexing or discarding processing on uplink information sent in each target spatial relation, and then send, in the target spatial relation, an uplink channel for transmitting uplink information after the multiplexing or discarding processing.

In addition, in this joint scenario, the terminal may process conflicting uplink information in a same spatial relation in the processing manner in the scenario 1, and process conflicting uplink information in different spatial relations in the processing manner in the scenario 2. Details are not described herein again.

In the uplink information transmission method in this embodiment of the present disclosure, when a conflict occurs on a plurality of pieces of uplink information sent by the terminal, conflict processing is performed on the plurality of pieces of uplink information, for example, conflicting uplink information is discarded, multiplexed, or switched, to obtain a target spatial relation of at least part of uplink information after the conflict processing. Therefore, the at least part of the uplink information is sent on a beam corresponding to the target spatial relation. Therefore, a solution of how the terminal sends uplink information after uplink information conflicts in the scenario in which the terminal supports multi-TRP is provided, thereby resolving a conflict of sending uplink information during multi-TRP transmission and enhancing support of the terminal for the multi-TRP scenario.

Figure 3:
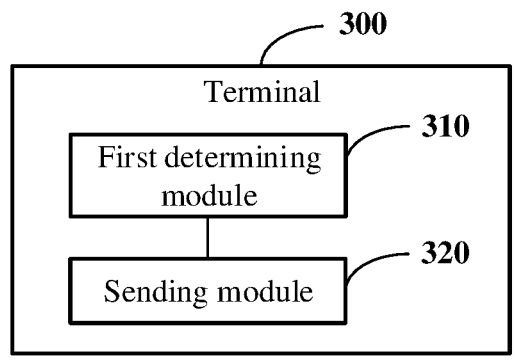
FIG. 3 is a schematic diagram of a module structure of a terminal according to an embodiment of the present disclosure.

As shown in FIG. 3, an embodiment of the present disclosure further provides a terminal 300. The terminal 300 may be specifically a terminal that supports a multi-TRP scenario, including:
a first determining module 310, configured to: when a plurality of pieces of uplink information conflict, determine a target spatial relation of at least part of uplink information in the plurality of pieces of uplink information, where the target spatial relation is at least one spatial relation configured or indicated by a network device for the terminal; and
a sending module 320, configured to send the at least part of uplink information based on the target spatial relation, where uplink information sent based on a same spatial relation in the target spatial relation does not conflict.

The terminal 300 further includes:
a second determining module, configured to determine the at least part of to-be-sent uplink information in the plurality of pieces of uplink information.

The second determining module includes one of the following:
a first determining submodule, configured to determine the at least part of to-be-sent uplink information according to a multiplexing/discarding criterion;
a second determining submodule, configured to determine at least one of the plurality of pieces of uplink information according to an instruction of the network device, to determine the at least part of to-be-sent uplink information;
a third determining submodule, configured to determine at least one of the plurality of pieces of uplink information according to a preset discarding criterion, to determine the at least part of to-be-sent uplink information; and
a fourth determining submodule, configured to determine all of the plurality of pieces of uplink information as the at least part of to-be-sent uplink information.

The second determining submodule or the third determining submodule includes:
a first determining unit, configured to discard a first part of uplink information in the plurality of pieces of uplink information, where the first part of uplink information is uplink information sent in at least one spatial relation in the target spatial relation according to a configuration or an instruction.

The preset discarding criterion is related to a priority of the uplink information, a priority of a channel/signal on which the uplink information is located, a priority of the spatial relation, and a terminal capability of the terminal.

The plurality of pieces of uplink information are sent based on a same spatial relation.

The first determining module 310 includes:
a fifth determining submodule, configured to determine, as a target spatial relation, an original spatial relation configured or indicated for the plurality of pieces of uplink information; or
a sixth determining submodule, configured to determine, as a target spatial relation, a new spatial relation configured or indicated by the network device; or
a seventh determining submodule, configured to determine, as a target spatial relation, a new spatial relation determined according to a preset switching criterion, where
the new spatial relation is different from the original spatial relation.

When the terminal supports a capability of sending uplink information based on a plurality of spatial relations, the first determining module 310 further includes:
an eighth determining submodule, configured to determine, as target spatial relations, an original spatial relation configured or indicated for the plurality of pieces of uplink information and a new spatial relation configured or indicated by the network device; or
a ninth determining submodule, configured to determine, as target spatial relations, an original spatial relation configured or indicated for the plurality of pieces of uplink information and a new spatial relation determined according to a preset switching criterion, where
the new spatial relation is different from the original spatial relation.

The plurality of pieces of uplink information are sent based on a plurality of different spatial relations.

The first determining module 310 further includes at least one of the following:
a tenth determining submodule, configured to determine, as a target spatial relation according to a preset switching criterion or a configuration or an instruction of the network device, at least one original spatial relation configured or indicated for the plurality of pieces of uplink information;
an eleventh determining submodule, configured to determine, as a target spatial relation, a new spatial relation configured or indicated by the network device; and
a twelfth determining submodule, configured to determine, as a target spatial relation, a new spatial relation determined according to the preset switching criterion, where
the new spatial relation is different from the original spatial relation.

The preset switching criterion includes at least one of the following:
determining, as a target spatial relation, a first spatial relation configured or indicated for a target channel/signal;
determining, as a target spatial relation, a second spatial relation configured or indicated for target uplink information, where a priority of the target uplink information is higher than or lower than a priority of other uplink information, and the other uplink information is at least one of the plurality of pieces of uplink information except the target uplink information;
determining a third spatial relation as a target spatial relation, where the third spatial relation is a predefined default spatial relation, or the third spatial relation is a spatial relation with a highest priority in spatial relations corresponding to the plurality of pieces of uplink information, or the third spatial relation is a spatial relation with a highest priority in spatial relations corresponding to the terminal;
determining, as a target spatial relation, a fourth spatial relation most recently indicated or configured by the network device; and
determining a fifth spatial relation as a target spatial relation, where the fifth spatial relation is a spatial relation corresponding to at least one uplink channel measurement resource with best receiving quality in a preset time period.

When the terminal supports a capability of sending uplink information based on a plurality of spatial relations simultaneously, the first determining module 310 further includes:
a thirteenth determining submodule, configured to: when the plurality of pieces of uplink information include at least one piece of first uplink information, determine, as a target spatial relation of the first uplink information, at least one spatial relation configured or indicated for the first uplink information, and determine, as a target spatial relation of other uplink information, another spatial relation configured or indicated for the first uplink information, where at least two spatial relations are configured or indicated for the first uplink information, and the other uplink information is at least one of the plurality of pieces of uplink information except the first uplink information.

It should be noted that the terminal is the terminal corresponding to the foregoing method. All implementations in the foregoing method embodiment are applicable to the embodiment of the terminal, and a same technical effect can be achieved.

In addition, it should be understood that division of the modules of the foregoing terminal is merely division of logical functions. In actual implementation, all or some of the modules may be integrated into one physical entity, or the modules may be physically separated. In addition, these modules may all be implemented in the form of software being invoked by processing elements; or may all be implemented in the form of hardware; or some of the modules may be implemented in the form of software being invoked by processing elements, and some of the modules may be implemented in the form of hardware. For example, a receiving module may be a processing element separately disposed, or may be integrated in a chip of the foregoing apparatus for implementation. In addition, the receiving module may be stored in a memory of the foregoing apparatus in a form of program code, and is invoked by a processing element of the foregoing apparatus to perform a function of the foregoing determining module. Implementations of other modules are similar thereto. In addition, all or some of these modules may be integrated together or implemented independently. The processing element herein may be an integrated circuit having a signal processing capability. During implementation, the steps of the foregoing method or the foregoing modules can be completed by hardware integrated logic circuits in the processor element or instructions in the form of software.

For example, the modules may be configured as one or more integrated circuits for implementing the foregoing method, for example, one or more application-specific integrated circuits (ASIC), one or more microprocessors (digital signal processor, DSP), or one or more field programmable gate arrays (FPGA). For another example, when a module above is implemented by invoking program code by using a processing element, the processing element may be a general-purpose processor, for example, a central processing unit (CPU) or another processor that can invoke program code. For another example, these modules may be integrated together, and implemented in a form of a system-on-a-chip (SOC).

An embodiment of the present disclosure further provides a terminal, and the terminal includes a processor, a memory, and a computer program that is stored in the memory and that can run on the processor. When the computer program is executed by the processor, steps of the foregoing uplink information sending method are implemented.

Figure 4:
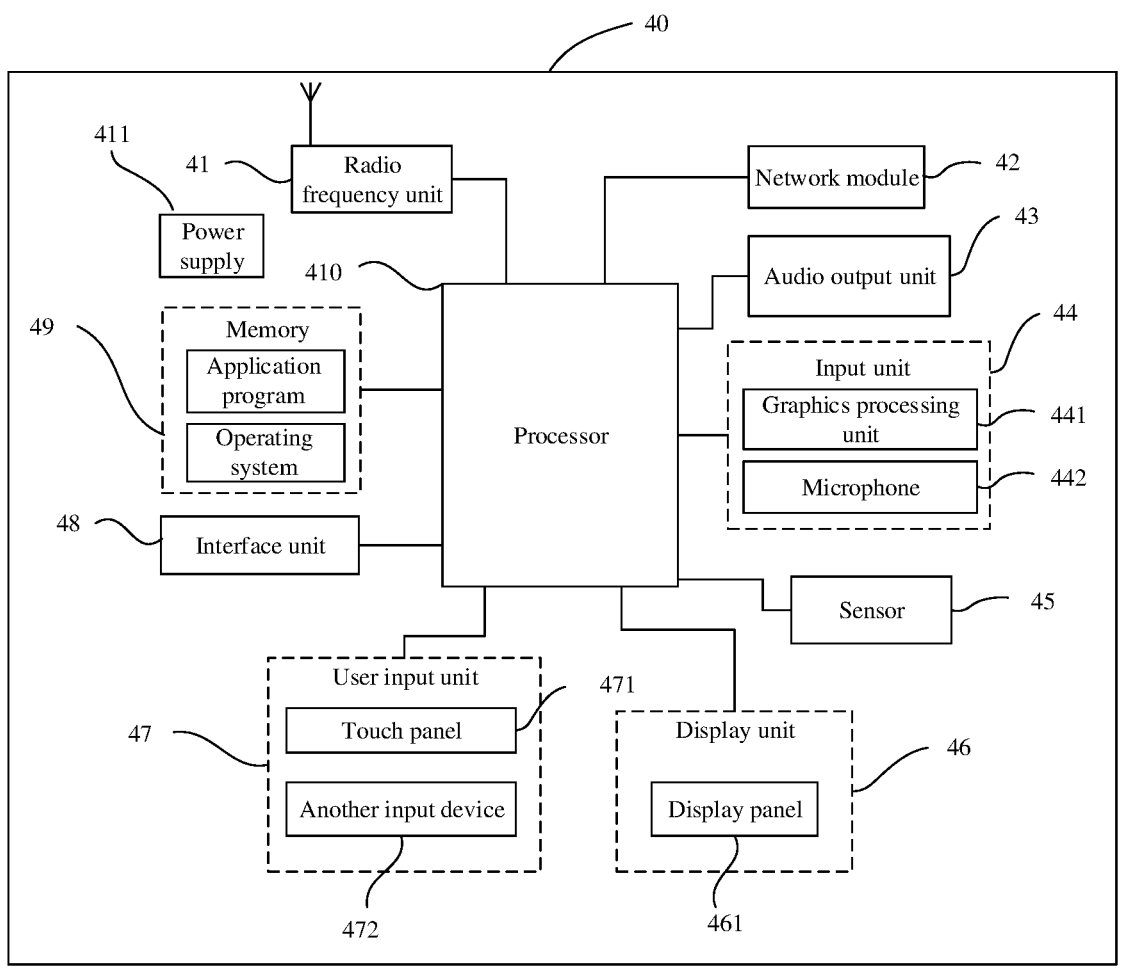
FIG. 4 is a schematic architecture diagram of a terminal according to an embodiment of the present disclosure.

As shown in FIG. 4, when the communications device is a terminal, the terminal 40 includes but is not limited to components such as a radio frequency unit 41, a network module 42, an audio output unit 43, an input unit 44, a sensor 45, a display unit 46, a user input unit 47, an interface unit 48, a memory 49, a processor 410, and a power supply 411. It may be understood by persons skilled in the art that, the terminal structure shown in FIG. 4 does not constitute any limitation on the terminal, and the terminal may include more or fewer components than those shown in the figure, or combine some components, or have different component arrangements. In this embodiment of the present disclosure, the terminal includes, but is not limited to, a mobile phone, a tablet computer, a notebook computer, a palmtop computer, a vehicle-mounted terminal, a wearable device, a pedometer, or the like.

The radio frequency unit 41 is configured to: when a plurality of pieces of uplink information conflict, determine a target spatial relation of at least part of uplink information in the plurality of pieces of uplink information, where the target spatial relation is at least one spatial relation configured or indicated by a network device for the terminal; and send the at least part of uplink information based on the target spatial relation, where uplink information sent based on a same spatial relation in the target spatial relation does not conflict.

It should be understood that, in some embodiments of the present disclosure, the radio frequency unit 41 may be configured to receive and send information or receive and send a signal in a call process. Specifically, after receiving downlink data from a base station, the radio frequency unit 41 sends the downlink data to the processor 410 for processing. In addition, the radio frequency unit 41 sends uplink data to the base station. Usually, the radio frequency unit 41 includes but is not limited to an antenna, at least one amplifier, a transceiver, a coupler, a low noise amplifier, a duplexer, and the like. In addition, the radio frequency unit 41 may communicate with a network and another device through a wireless communication system.

The terminal provides wireless broadband Internet access for a user by using the network module 42, for example, helps the user send and receive an email, browse a web page, and access streaming media.

The audio output unit 43 may convert audio data received by the radio frequency unit 41 or the network module 42 or stored in the memory 49 into an audio signal and output the audio signal as a sound. In addition, the audio output unit 43 can also provide audio output related to a specific function performed by the terminal 40 (for example, call signal receiving sound or message receiving sound). The audio output unit 43 includes a speaker, a buzzer, a receiver, and the like.

The input unit 44 is configured to receive an audio signal or a video signal. The input unit 44 may include a graphics processing unit (GPU) 441 and a microphone 442. The graphics processing unit 441 processes image data of a static image or video obtained by an image capture apparatus (such as, a camera) in a video capture mode or an image capture mode. A processed image frame may be displayed on the display unit 46. The image frame processed by the graphics processing unit 441 may be stored in the memory 49 (or another storage medium) or sent by using the radio frequency unit 41 or the network module 42. The microphone 442 may receive sound and can process such sound into audio data. The processed audio data may be converted, in a call mode, into a format that can be sent by using the radio frequency unit 41 to a mobile communication base station, and the format is output.

The terminal 40 further includes at least one type of sensor 45, such as a light sensor, a motion sensor, and another sensor. Specifically, the light sensor includes an ambient light sensor and a proximity sensor, where the ambient light sensor can adjust brightness of the display panel 461 based on brightness of ambient light, and the proximity sensor can turn off the display panel 461 and/or backlight when the terminal 40 moves towards the ear. As a type of the motion sensor, an accelerometer sensor may detect an acceleration value in each direction (generally, three axes), and detect a value and a direction of gravity when the accelerometer sensor is static, and may be used in an application for recognizing a terminal posture (such as screen switching between landscape and portrait modes, a related game, or magnetometer posture calibration), a function related to vibration recognition (such as a pedometer or a knock), and the like. The sensor 45 may further include a fingerprint sensor, a pressure sensor, an iris sensor, a molecular sensor, a gyroscope, a barometer, a hygrometer, a thermometer, an infrared sensor, and the like. Details are not described herein.

The display unit 46 is configured to display information entered by a user or information provided for the user. The display unit 46 may include a display panel 461, and the display panel 461 may be configured in a form of a liquid crystal display (LCD), an organic light-emitting diode (OLED), or the like.

The user input unit 47 may be configured to receive input digit or character information and generate key signal input related to user setting and function control of user equipment. Specifically, the user input unit 47 includes a touch panel 471 and another input device 472. The touch panel 471 is also referred to as a touchscreen, and may collect a touch operation performed by a user on or near the touch panel 471 (such as an operation performed by a user on the touch panel 471 or near the touch panel 471 by using any proper object or accessory, such as a finger or a stylus). The touch panel 471 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to the processor 410, and receives and executes a command sent by the processor 410. In addition, the touch panel 471 can be implemented in various types such as resistive, capacitive, infrared, and a surface acoustic wave. In addition to the touch panel 471, the user input unit 47 may further include the another input device 472. Specifically, the another input device 472 may include but is not limited to a physical keyboard, a functional button (such as a volume control button or a power on/off button), a trackball, a mouse, and a joystick. Details are not described herein.

Further, the touch panel 471 may cover the display panel 461. When detecting the touch operation on or near the touch panel 471, the touch panel 471 transmits the touch operation to the processor 410 to determine a type of a touch event, and then the processor 410 provides corresponding visual output on the display panel 461 based on the type of the touch event. In FIG. 4, the touch panel 471 and the display panel 461 are used as two independent components to implement input and output functions of the terminal. However, in some embodiments, the touch panel 471 and the display panel 461 may be integrated to implement the input and output functions of the terminal. This is not specifically limited herein.

The interface unit 48 is an interface connecting an external apparatus to the terminal 40. For example, the external apparatus may include a wired or wireless headset port, an external power supply (or battery charger) port, a wired or wireless data port, a storage card port, a port configured to connect to an apparatus having an identification module, an audio input/output (I/O) port, a video I/O port, a headset port, and the like. The interface unit 48 may be configured to receive input (for example, data information and power) from the external apparatus and transmit the received input to one or more elements in the terminal 40, or may be configured to transmit data between the terminal 40 and the external apparatus.

The memory 49 may be configured to store a software program and various data. The memory 49 may mainly include a program storage area and a data storage area. The program storage area may store an operating system, an application program required by at least one function (such as a sound play function or an image play function), and the like. The data storage area may store data (such as audio data or an address book) created based on use of the mobile phone, and the like. In addition, the memory 49 may include a high-speed random access memory or a nonvolatile memory, for example, at least one magnetic disk storage device, a flash memory device, or another volatile solid-state storage device.

The processor 410 is a control center of the terminal, and connects all parts of the entire terminal by using various interfaces and lines. By running or executing a software program and/or a module stored in the memory 49 and invoking data stored in the memory 49, the processor 410 performs various functions of the terminal and data processing, to perform overall monitoring on the terminal. The processor 410 can include one or more processing units. Preferably, the processor 410 can be integrated with an application processor and a modem processor. The application processor mainly processes the operating system, the user interface, applications, etc. The modem processor mainly processes wireless communication. It may be understood that alternatively, the modem processor may not be integrated into the processor 410.

The terminal 40 may further include the power supply 411 (such as a battery) that supplies power to each component. Preferably, the power supply 411 may be logically connected to the processor 410 by using a power management system, so as to implement functions such as charging, discharging, and power consumption management by using the power management system.

In addition, the terminal 40 includes some function modules that are not shown. Details are not described herein.

Preferably, the terminal in this embodiment of the present disclosure may be a wireless terminal or may be a wired terminal. The wireless terminal may be a device that provides a user with connectivity of voice and/or other service data, a handheld device with a wireless connection function, or another processing device connected to a wireless modem. The wireless terminal may communicate with one or more core networks through a radio access network (RAN). The wireless terminal may be a mobile terminal, such as a mobile phone (or referred to as a "cellular" phone) and a computer with a mobile terminal, and may be, for example, a portable, pocket-sized, handheld, computer built-in, or vehicle-mounted mobile apparatus, which exchange language and/or data with a radio access network. For example, the wireless terminal may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile console (Mobile), a remote station, a remote terminal, an access terminal, a user terminal, a user agent, or a user device or user equipment. This is not limited herein.

An embodiment of the present disclosure further provides a computer-readable storage medium. The computer-readable storage medium stores a computer program, and when the computer program is executed by a processor, steps of the foregoing uplink information sending method are implemented.

In the foregoing embodiments of the present disclosure, after a plurality of channels/signals conflict, collision between the plurality of channels/signals can still be resolved when a plurality of TRP scenarios are supported, thereby improving a communication range and efficiency of a terminal.

The embodiments of the present disclosure are described above with reference to the accompanying drawings, but the present disclosure is not limited to the above specific implementations, and the above specific implementations are merely illustrative but not restrictive. Under the enlightenment of the present disclosure, a person of ordinary skill in the art can make many forms without departing from the purpose of the present disclosure and the protection scope of the claims, all of which fall within the protection of the present disclosure.

The invention claimed is:

1. An uplink information sending method, applied to a terminal, wherein the method comprises:
for a plurality of pieces of uplink information to be sent based on a plurality of spatial relations in conflict, determining a target spatial relation of at least part of uplink information in the plurality of pieces of uplink information, wherein the at least part of uplink information in the plurality of pieces of uplink information is to-be-sent uplink information in the plurality of pieces of uplink information, and the target spatial relation is at least one spatial relation of the plurality of spatial relations, configured or indicated by a network device for the terminal; and
sending the at least part of uplink information in the plurality of pieces of uplink information based on the target spatial relation, wherein uplink information sent based on a same spatial relation in the target spatial relation does not conflict;
wherein conflict between the plurality of pieces of uplink information means that at least one orthogonal frequency division multiplexing (OFDM) symbol of time-frequency resources of channels or signals, wherein the channels or signals are used to transmit the plurality of pieces of uplink information overlaps in time domain.

2. The uplink information sending method according to claim 1, before the step of sending the at least part of uplink information in the plurality of pieces of uplink information based on the target spatial relation, further comprising:
determining the to-be-sent uplink information in the plurality of pieces of uplink information.

3. The uplink information sending method according to claim 2, wherein the step of determining the to-be-sent uplink information in the plurality of pieces of uplink information comprises one of the following:
determining the to-be-sent uplink information according to a multiplexing/discarding criterion;
discarding at least one of the plurality of pieces of uplink information according to an instruction of the network device, so as to determine the to-be-sent uplink information;
discarding at least one of the plurality of pieces of uplink information according to a preset discarding criterion, so as to determine the to-be-sent uplink information; and
determining all of the plurality of pieces of uplink information as the to-be-sent uplink information.

4. The uplink information sending method according to claim 3, wherein the step of discarding at least one of the plurality of pieces of uplink information according to an instruction of the network device, or discarding at least one of the plurality of pieces of uplink information according to a preset discarding criterion, comprises:
discarding a first part of uplink information in the plurality of pieces of uplink information, wherein the first part of uplink information is uplink information sent in at least one spatial relation in target spatial relation according to a configuration or an instruction.

5. The uplink information sending method according to claim 3, wherein the preset discarding criterion is related to a priority of the uplink information, a priority of a channel/signal on which the uplink information is located, a priority of the spatial relation, and a terminal capability of the terminal.

6. The uplink information sending method according to claim 1, wherein the plurality of pieces of uplink information are sent based on a same spatial relation in the target spatial relation.

7. The uplink information sending method according to claim 6, wherein the step of determining a target spatial relation of at least part of uplink information in the plurality of pieces of uplink information comprises one of the following:
determining, as a target spatial relation, an original spatial relation configured or indicated for the plurality of pieces of uplink information;
determining, as a target spatial relation, a new spatial relation configured or indicated by the network device; and
determining, as a target spatial relation, a new spatial relation determined according to a preset switching criterion, wherein
the new spatial relation is different from the original spatial relation.

8. The uplink information sending method according to claim 6, wherein the terminal supports a capability of sending uplink information based on a plurality of spatial relations simultaneously, the step of determining a target spatial relation of at least part of uplink information in the plurality of pieces of uplink information further comprises one of the following:
determining, as target spatial relations, an original spatial relation configured or indicated for the plurality of pieces of uplink information and a new spatial relation configured or indicated by the network device; and
determining, as target spatial relations, an original spatial relation configured or indicated for the plurality of pieces of uplink information and a new spatial relation determined according to a preset switching criterion, wherein
the new spatial relation is different from the original spatial relation.

9. The uplink information sending method according to claim 1, wherein the plurality of pieces of uplink information are sent based on a plurality of different spatial relations in the target spatial relation.

10. The uplink information sending method according to claim 9, wherein the step of determining a target spatial relation of at least part of uplink information in the plurality of pieces of uplink information comprises at least one of the following:

determining, as a target spatial relation according to a preset switching criterion or a configuration or an instruction of the network device, at least one original spatial relation configured or indicated for the plurality of pieces of uplink information;

determining, as a target spatial relation, a new spatial relation configured or indicated by the network device; and determining, as a target spatial relation, a new spatial relation determined according to the preset switching criterion, wherein the new spatial relation is different from an original spatial relation.

11. The uplink information sending method according to claim 9, wherein the preset switching criterion comprises at least one of the following:

determining, as a target spatial relation, a first spatial relation configured or indicated for a target channel/signal;

determining, as a target spatial relation, a second spatial relation configured or indicated for target uplink information; wherein a priority of the target uplink information is higher than or lower than a priority of other uplink information, and the other uplink information is at least one of the plurality of pieces of uplink information except the target uplink information;

determining a third spatial relation as a target spatial relation; wherein the third spatial relation is a predefined default spatial relation, or the third spatial relation is a spatial relation with a highest priority in spatial relations corresponding to the plurality of pieces of uplink information, or the third spatial relation is a spatial relation with a highest priority in spatial relations corresponding to the terminal;

determining, as a target spatial relation, a fourth spatial relation most recently indicated or configured by the network device; and determining a fifth spatial relation as a target spatial relation, wherein the fifth spatial relation is a spatial relation corresponding to at least one uplink channel measurement resource with best receiving quality in a preset time period.

12. The uplink information sending method according to claim 9, wherein the terminal supports a capability of sending uplink information based on a plurality of spatial relations simultaneously, the step of determining a target spatial relation of at least part of uplink information in the plurality of pieces of uplink information further comprises:

for the plurality of pieces of uplink information comprising at least one piece of first uplink information, determining, as a target spatial relation of the first uplink information, at least one spatial relation configured or indicated for the first uplink information, and determining, as a target spatial relation of other uplink information, another spatial relation configured or indicated for the first uplink information, wherein at least two spatial relations are configured or indicated for the first uplink information, and the other uplink information is at least one of the plurality of pieces of uplink information except the first uplink information.

13. A terminal, comprising a processor, a memory, and a computer program that is stored in the memory and that can run on the processor, wherein the computer program is executed by the processor to perform steps of:

for a plurality of pieces of uplink information, to be sent based on a plurality of spatial relations in conflict, determining a target spatial relation of at least part of uplink information in the plurality of pieces of uplink information, wherein the at least part of uplink information in the plurality of pieces of uplink information is to-be-sent uplink information in the plurality of pieces of uplink information, and the target spatial relation is at least one spatial relation of the plurality of spatial relations, configured or indicated by a network device for the terminal; and sending the at least part of uplink information in the plurality of pieces of uplink information based on the target spatial relation, wherein uplink information sent based on a same spatial relation in the target spatial relation does not conflict;

wherein conflict between the plurality of pieces of uplink information means that at least one orthogonal frequency division multiplexing (OFDM) symbol of time-frequency resources of channels or signals, wherein the channels or signals are used to transmit the plurality of pieces of uplink information overlaps in time domain.

14. The terminal according to claim 13, wherein the computer program is executed by the processor to perform steps of:

determining the to-be-sent uplink information in the plurality of pieces of uplink information.

15. The terminal according to claim 14, wherein the computer program is executed by the processor to perform one of the following steps of:

determining the to-be-sent uplink information according to a multiplexing/discarding criterion;

discarding at least one of the plurality of pieces of uplink information according to an instruction of the network device, so as to determine the to-be-sent uplink information;

discarding at least one of the plurality of pieces of uplink information according to a preset discarding criterion, so as to determine the to-be-sent uplink information; wherein the preset discarding criterion is related to a priority of the uplink information, a priority of a channel/signal on which the uplink information is located, a priority of the spatial relation, and a terminal capability of the terminal; and determining all of the plurality of pieces of uplink information as the to-be-sent uplink information.

16. The terminal according to claim 15, wherein the computer program is executed by the processor to perform steps of:

discarding a first part of uplink information in the plurality of pieces of uplink information, wherein the first part of uplink information is uplink information sent in at least one spatial relation in target spatial relation according to a configuration or an instruction.

17. The terminal according to claim 13, wherein the plurality of pieces of uplink information are sent based on a same spatial relation in the target spatial relation, or, the plurality of pieces of uplink information are sent based on a plurality of different spatial relations in the target spatial relation.

18. The terminal according to claim 17, wherein the computer program is executed by the processor to perform one of the following: determining, as a target spatial relation, an original spatial relation configured or indicated for the plurality of pieces of uplink information; determining, as a target spatial relation, a new spatial relation configured or indicated by the network device; or, determining, as a target spatial relation, a new spatial relation determined according to a preset switching criterion, wherein the new spatial relation is different from the original spatial relation;

or,
wherein the terminal supports a capability of sending uplink information based on a plurality of spatial relations simultaneously, the computer program is executed by the processor to perform one of the following: determining, as target spatial relations, an original spatial relation configured or indicated for the plurality of pieces of uplink information and a new spatial relation configured or indicated by the network device; or, determining, as target spatial relations, an original spatial relation configured or indicated for the plurality of pieces of uplink information and a new spatial relation determined according to a preset switching criterion, wherein the new spatial relation is different from the original spatial relation.

19. The terminal according to claim 17, wherein the computer program is executed by the processor to perform at least one of the following: determining, as a target spatial relation according to a preset switching criterion or a configuration or an instruction of the network device, at least one original spatial relation configured or indicated for the plurality of pieces of uplink information; determining, as a target spatial relation, a new spatial relation configured or indicated by the network device; or, determining, as a target spatial relation, a new spatial relation determined according to the preset switching criterion, wherein the new spatial relation is different from an original spatial relation;

or,
the terminal supports a capability of sending uplink information based on a plurality of spatial relations simultaneously, the computer program is executed by the processor to perform at least one of the following: for the plurality of pieces of uplink information comprising at least one piece of first uplink information, determining, as a target spatial relation of the first uplink information, at least one spatial relation configured or indicated for the first uplink information, and determining, as a target spatial relation of other uplink information, another spatial relation configured or indicated for the first uplink information, wherein at least two spatial relations are configured or indicated for the first uplink information, and the other uplink information is at least one of the plurality of pieces of uplink information except the first uplink information.

20. A non-transitory computer-readable storage medium, wherein the computer-readable storage medium stores a computer program, and the computer program is executed by a processor to perform steps of:

for a plurality of pieces of uplink information, to be sent based on a plurality of spatial relations, in conflict, determining a target spatial relation of at least part of uplink information in the plurality of pieces of uplink information, wherein the at least part of uplink information in the plurality of pieces of uplink information is to-be-sent uplink information in the plurality of pieces of uplink information, and the target spatial relation is at least one spatial relation of the plurality of spatial relations, configured or indicated by a network device for the terminal; and sending the at least part of uplink information in the plurality of pieces of uplink information based on the target spatial relation, wherein uplink information sent based on a same spatial relation in the target spatial relation does not conflict;

wherein conflict between the plurality of pieces of uplink information means that at least one orthogonal frequency division multiplexing (OFDM) symbol of time-frequency resources of channels or signals, wherein the channels or signals are used to transmit the plurality of pieces of uplink information overlaps in time domain.

* * * * *